US012783400B2

(12) United States Patent
Zhao et al.

(10) Patent No.: US 12,783,400 B2
(45) Date of Patent: Nov. 3, 2026

(54) METHOD AND APPARATUS FOR DATA WRITING AND READING

(71) Applicant: Beijing ESWIN Computing Technology Co., Ltd., Beijing (CN)

(72) Inventors: Zikui Zhao, Beijing (CN); Dongdong Zhang, Beijing (CN); Shenlin Liang, Beijing (CN)

( * ) Notice: Subject to any disclaimer, the term of this patent is extended or adjusted under 35 U.S.C. 154(b) by 0 days.

(21) Appl. No.: 18/917,867

(22) Filed: Oct. 16, 2024

(65) Prior Publication Data

US 2025/0130934 A1 Apr. 24, 2025

(30) Foreign Application Priority Data

Oct. 20, 2023 (CN) ........................ 202311370309.5

(51) Int. Cl.
*G06F 12/02* (2006.01)
*G06F 21/75* (2013.01)

(52) U.S. Cl.
CPC .......... *G06F 12/0223* (2013.01); *G06F 21/75* (2013.01)

(58) Field of Classification Search
CPC ...... G06F 12/0223; G06F 21/75; G06F 21/79; G06F 3/062; G06F 3/0655; G06F 3/0679
See application file for complete search history.

(56) References Cited

U.S. PATENT DOCUMENTS

2009/0207665 A1* 8/2009 Louie ..................... G11C 16/22 365/230.03
2022/0359016 A1* 11/2022 Lin ......................... G06F 21/73 707/741
2023/0325149 A1* 10/2023 Yu ........................... G06F 9/445 707/741
2025/0044979 A1* 2/2025 Li ........................... G06F 3/067 707/741

* cited by examiner

*Primary Examiner* — Yuk Ting Choi

(57) ABSTRACT

A method and apparatus for data writing and reading relate to the field of storage. The data writing method includes: during data writing, re-sorting various subdata contained in target data to generate a writing sequence, wherein the writing sequence is different from an original arrangement sequence of the subdata in the target data; executing writing operation on the subdata according to the writing sequence; and locking the writing sequence, or prohibiting execution of an action for generating the writing sequence after determining that the writing operation is executed on all the subdata. By re-sorting the subdata of the target data and writing the data in a manner of disturbing the original arrangement sequence, the difficulty in cracking data stored in a memory can be increased, and the security of data storage can be ensured.

8 Claims, 4 Drawing Sheets

METHOD AND APPARATUS FOR DATA WRITING AND READING

1. TECHNICAL FIELD

The present application relates to the field of storage, and more particularly relates to a method and apparatus for data writing and reading.

2. BACKGROUND ART

As a non-volatile programmable memory, an OTP memory has a feature that stored data does not disappear due to power-off, wherein the OTP memory, applying OTP (One Time Programmable, abbreviated as OTP), allows programming only once in a process of using, and once the OTP memory is programmed, data is permanently valid. Based on the above feature, the OTP memory is often used for saving important data, and especially used for storing a secret key as a security chip.

Although the security chip has relatively strong confidentiality, due to a storage feature thereof, reverse cracking may be performed by observing from a hardware structure, thereby resulting in the risk that the data stored in the OTP memory may be cracked, and then resulting in relatively low security of data storage.

3. SUMMARY OF THE INVENTION

Examples of the present application provide a method and apparatus for data writing and reading, with a main object of increasing the difficulty in cracking data stored in an OTP memory, and ensuring the security of data storage.

In order to solve the above technical problem, the examples of the present application provide the following technical solutions.

In a first aspect, the present application provides a data writing method, including: re-sorting various subdata contained in target data to generate a writing sequence, wherein the writing sequence is different from an original arrangement sequence of the subdata in the target data; executing writing operation on the subdata according to the writing sequence; and locking the writing sequence, or prohibiting execution of an action for generating the writing sequence after determining that the writing operation is executed on all the subdata.

In a second aspect, the present application further provides a data reading method, including: acquiring a writing sequence when determining that the writing sequence is locked, or when determining that an action for generating the writing sequence is prohibited, wherein the writing sequence is a sequence of a plurality of subdata contained in target data when writing operation is executed, and the writing sequence is different from an original arrangement sequence of the subdata in the target data; and executing reading operation on the subdata according to the writing sequence.

In a third aspect, the present application further provides a data writing apparatus, including: a generation unit configured for re-sorting various subdata contained in target data to generate a writing sequence, wherein the writing sequence is different from an original arrangement sequence of the subdata in the target data; a writing unit configured for executing writing operation on the subdata according to the writing sequence generated by the generation unit; and an execution unit configured for locking the writing sequence, or prohibiting execution of an action for generating the writing sequence after determining that the writing operation is executed on all the subdata.

In a fourth aspect, the present application further provides a data reading apparatus, including: an acquisition unit configured for acquiring a writing sequence when determining that the writing sequence is locked, or when determining that an action for generating the writing sequence is prohibited, wherein the writing sequence is a sequence of a plurality of subdata contained in target data when writing operation is executed, and the writing sequence is different from an original arrangement sequence of the subdata in the target data; and a reading unit configured for executing reading operation on the subdata according to the writing sequence acquired by the acquisition unit.

In a fifth aspect, an example of the present application provides a storage medium, including a stored program, wherein a device in which the storage medium is positioned is controlled to execute the data writing method according to the first aspect or the data reading method according to the second aspect during program runtime.

In a sixth aspect, an example of the present application provides an electronic device, including: at least one processor, and at least one memory and a bus which are connected to the processor; wherein the processor and the memory communicate with each other via the bus; and the processor is configured for calling program instructions in the memory to execute the data writing method according to the first aspect or the data reading method according to the second aspect.

In a seventh aspect, an example of the present application further provides a memory, including: a storage controller, a sequence adjuster, an abort controller and a storage array; wherein the sequence adjuster is configured for re-sorting various subdata contained in target data to generate a writing sequence, wherein the writing sequence is different from an original arrangement sequence of the subdata in the target data; the storage controller is configured for executing writing operation on the subdata in the storage array according to the writing sequence; and the abort controller is configured for locking the writing sequence, or prohibiting execution of an action for generating the writing sequence after determining that the writing operation is executed on all the subdata.

Optionally, the sequence adjuster is further configured for re-sorting the various subdata at least once to obtain at least one first arrangement sequence different from the original arrangement sequence as the writing sequence; and configured for recording each of the first arrangement sequences and a corresponding arrangement sequence identifier into a sequence list if a quantity of the first arrangement sequences is multiple, based on a target number generated by a preset random number generator, searching for an arrangement sequence identifier matching the target number from the sequence list, and taking the first arrangement sequence corresponding to the arrangement sequence identifier as the writing sequence.

Optionally, the sequence adjuster is further specifically configured for re-sorting the various subdata contained in the target data multiple times by preset algorithms, wherein the preset algorithm selected during re-sorting each time comprises one of a bubble sort algorithm, an insertion sort algorithm and a selection sort algorithm.

Optionally, the abort controller is further specifically configured for locking the writing sequence by locking the target number, or prohibiting the execution of the action for generating the writing sequence by prohibiting a function of the preset random number generator after determining that the writing operation is executed on all the subdata.

Optionally, the storage controller is further configured for setting a corresponding idle character for each of the subdata; and writing the idle character into a next storage address adjacent to a storage address after writing each of the subdata into the storage address, wherein a number of bytes of the idle character is greater than or equal to a number of bytes of the corresponding subdata.

Optionally, the memory further includes: a reading controller configured for acquiring a writing sequence when determining that the writing sequence is locked, or when determining that an action for generating the writing sequence is prohibited, wherein the writing sequence is a sequence of a plurality of subdata contained in target data when writing operation is executed, and the writing sequence is different from an original arrangement sequence of the subdata in the target data; and executing reading operation on the subdata in the storage array according to the writing sequence.

Optionally, the writing sequence is determined by acquiring an arrangement sequence of the subdata corresponding to a target number in a sequence list based on the target number generated by a preset random number generator; wherein the sequence list contains the arrangement sequence of each of the subdata and a corresponding arrangement sequence identifier; and the reading controller is further configured for acquiring the arrangement sequence of the subdata corresponding to the target number in the sequence list based on the target number as the writing sequence when determining that the target number is locked, or when determining that a function of the preset random number generator is prohibited.

Optionally, the reading controller is configured for extracting all of the subdata, and sorting the subdata based on the writing sequence to obtain the target data; or extracting corresponding subdata sequentially according to the writing sequence, and obtaining the target data after extracting all of the subdata.

Optionally, the reading controller is configured for extracting data containing all of the subdata and all of corresponding idle characters as extracted data when determining that the idle characters corresponding to the subdata are also stored in a memory storing the subdata; and determining a position of the idle character corresponding to each of the subdata in the extracted data and a data volume of the idle character in the extracted data, deleting all of the idle characters based on the position of each of the idle characters in the extracted data and the data volume of each of the idle characters to obtain all of the subdata, and sorting the subdata according to the writing sequence to obtain the target data.

Optionally, the reading controller is further specifically configured for determining a storage address of each of the subdata in the memory, and extracting each of the subdata sequentially according to the storage address and the writing sequence when determining that idle characters corresponding to the subdata are also stored in the memory storing the subdata; and obtaining the target data when determining that all the subdata is extracted.

Optionally, the reading controller is further configured for determining data to be read based on a reading instruction, wherein the data to be read comprises at least one of the subdata; determining a reading sequence of the data to be read based on the writing sequence when determining that the data to be read contains at least two of the subdata, wherein the reading sequence is an arrangement sequence of the at least two of the subdata determined based on the writing sequence; and reading the subdata in the data to be read in the storage array based on the reading sequence.

By means of the above technical solutions, the technical solutions provided by the present application have at least the following advantages.

According to the examples of the present application, since various subdata of the target data is written into the addresses of the memory according to the writing sequence, and the writing sequence is different from the original arrangement sequence of the subdata in the target data, the sequence of storing the various subdata in the addresses of the memory is different from the sequence of storing the subdata in the addresses according to the original arrangement sequence in a conventional manner. Namely, data obtained by combining the stored various subdata according to a sequence among the addresses is different from the target data, and therefore during data reading, data obtained by reading the various subdata only according to a physical sequence among the addresses in the memory by a cracker in the case where the writing sequence is unknown is different from the target data, thereby increasing the difficulty in cracking the data stored in the memory, and ensuring the security of data storage.

Moreover, after the writing operation is executed, the writing sequence is also locked or the execution of the action for generating the writing sequence is prohibited, and in the reading process, firstly whether the writing sequence or action for generating the writing sequence is locked is decided, so as to ensure that the problem of subsequent reading failure caused by generating the writing sequence again after completing a writing action in a process of executing data writing and reading each time can be avoided, and the problem of abnormal data reading caused by tampering with the writing sequence is also avoid, thereby further guaranteeing the security of data storage.

The above description is merely an overview of the technical solutions of the present application, in order to enable the technical means of the present application to be understood more clearly and implemented according to the contents of the specification, and in order to enable the above and other objects, features and advantages of the present application to be more apparent, specific embodiments of the present application are set forth below.

4. BRIEF DESCRIPTION OF ACCOMPANY DRAWINGS

The above and other objects, features and advantages of exemplary embodiments of the present application will be readily understood by reading the following detailed description with reference to accompanying drawings. In the accompanying drawings, several embodiments of the present application are shown by way of example, and not by way of limitation, and identical or corresponding reference numerals represent identical or corresponding parts, in which.

5. DETAILED DESCRIPTION OF THE INVENTION

Figure 1:
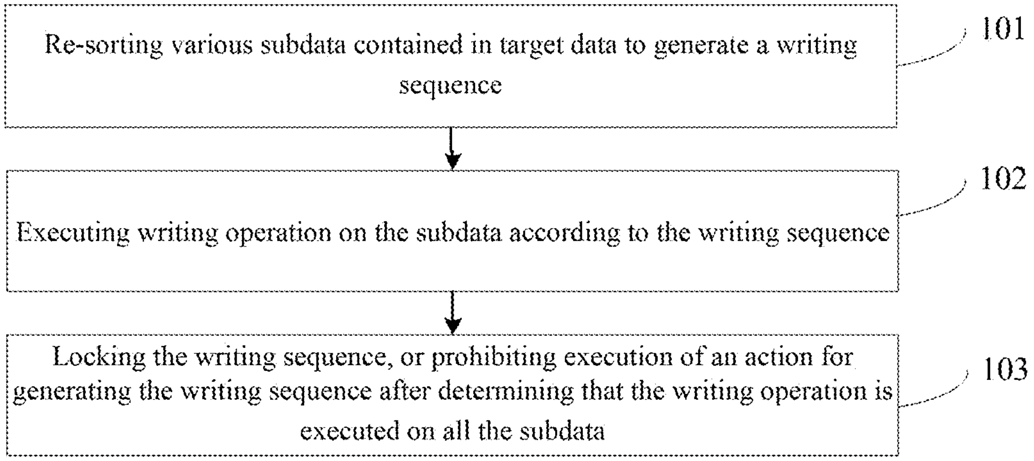
FIG. 1 shows a flowchart of a data writing method provided by an example of the present application.

Exemplary embodiments of the present application will be described in more detail below with reference to accompanying drawings. While the exemplary embodiments of the present application are illustrated in the accompanying drawings, it should be understood that the present application may be implemented in various forms and should not be construed as being limited to the embodiments set forth herein. In contrast, these embodiments are provided to enable a more thorough understanding of the present application and to enable a complete communication of the scope of the present application to those skilled in the art.

It should be noted that unless otherwise indicated, technical or scientific terms used in the present application should have the ordinary meaning as understood by those skilled in the art to which the present application belongs.

As a special type of non-volatile memory, an OTP memory only allows to be burnt once, and once the OTP memory is burnt, data is permanently valid, so that the OTP memory is commonly used for storing reliable and rereadable data, such as startup programs, encryption keys, and analog device configuration parameters. There are generally two different implementation modes for the OTP memory: a fuse-based implementation mode and an antifuse-based implementation mode. With regard to the OTP memory having the fuse-based implementation mode, a unit thereof is in a conducting state before burning, and a fuse is fused and conduction is turned off after burning; while with regard to the OTP memory having the antifuse-based implementation mode, a unit thereof is manifested as an open circuit state before burning, and a circuit is conducted after the fuse is burnt. Namely, the writing and storage of data stored in the OTP may be achieved by performing fusing or antifusing burning on the fuses of various units in the OTP memory.

At present, when the OTP memory is researched and cracked through reverse engineering, an internal structure of the OTP memory may be exposed by utilizing physical grinding and focused ion beam cutting, and since storage area units of the OTP memory are physically continuous, the data stored in the OTP memory may be read by observing the internal structure of the OTP memory using an electron microscope and recording states of the various units of the OTP memory sequentially, or the data stored in the OTP memory may also be acquired by connecting an electronic device to an exposed internal signal line of the OTP memory and performing reading.

Through research, the inventor of the present application has found that in the related art, when performing data writing and reading on the OTP memory, generally various subdata of the data is written and read sequentially, namely during writing, the various subdata of the data is stored into continuous addresses of the OTP memory sequentially; while during reading, the continuous addresses of the OTP memory are read sequentially. Based on physical properties of the OTP memory, the above conventional data reading and writing modes can result in that the data stored in the OTP memory are likely to be cracked by the reverse engineering, so that the security of data storage is relatively low.

At least one example of the present application provides a method and apparatus for data writing and reading. By changing sequences of writing and reading various subdata of data into and from an OTP memory, when contents in addresses of the OTP memory are read sequentially and combined, the actual stored data cannot be restored, thereby increasing the difficulty in cracking the data stored in the OTP memory, and ensuring the security of data storage.

An example of the present application provides a data writing and reading method, wherein in a writing process, as specifically shown in FIG. 1, the method includes:

101. re-sorting various subdata contained in target data to generate a writing sequence, wherein the writing sequence is different from an original arrangement sequence of the subdata in the target data.

Due to reliable storage and repeatable reading, an OTP memory may be used for scenarios such as the storage of important data. The target data in this example may be data written into the OTP memory, for example, the target data may be data formed by any one or a combination of some of a private key, a chip ID, a startup program and the like of a user, and this is not specifically limited in the example of the present application.

For example, the target data may include several subdata, and various subdata may be subdata having the same data size. For example, when writing a piece of sixteen-bit user private key into the OTP memory, each bit of the user private key may be taken as one subdata; or the user private key may be a private key which is divided in a unit of four bits, in this case, the target data may be considered to include four subdata, and each four-bit private key session is one subdata.

Of course, the subdata of the target data may also be subdata having different data sizes. For example, when a piece of information related to a security chip is written into the OTP memory as the target data, the subdata of the target data may be specifically as follows: the user secret key of the security chip is the first subdata, and a chip ID is the second subdata.

In some cases, the user may also divide the target data into several subdata voluntarily as required before executing writing operation on the target data. For example, when writing a sixteen-bit private key into the OTP memory as the target data, the user may divide the target data into four subdata voluntarily, and each of the subdata includes four bits of the sixteen-bit private key sequentially; and the user may also divide the target data into three subdata voluntarily, wherein the first subdata includes the first bit to the third bit of the sixteen-bit private key, the second subdata includes the fourth bit to the eighth bit of the sixteen-bit private key, and the third subdata includes the ninth bit to the sixteenth bit of the sixteen-bit private key. The mode in which the target data is divided into the subdata is not specifically limited in the example of the present application.

After determining the subdata of the target data, various subdata contained in the target data is re-sorted, and a sequence of the various re-sorted subdata may be taken as a sequence of writing the various subdata into the OTP memory, namely a writing sequence. The re-sorting of the various subdata may be random or may also be performed according to a preset rule, and this is not limited in the example of the present application.

For example, it is assumed that the target data X sequentially contains four subdata: the first subdata "A", the second subdata "B", the third subdata "C" and the fourth subdata "D", namely contents of the target data X are "ABCD", then the four subdata may be re-sorted, and the obtained result of the re-sorting is as follows: in the re-sorted "queue", the first bit is the fourth subdata "D" of the target data X, the second bit is the second subdata "B" of the target data X, the third bit is the third subdata "C" of the target data X, and the fourth bit is the first subdata "A" of the target data X, namely "DBCA", and at this moment, the determined writing sequence is 4231.

102. Executing writing operation on the subdata according to the writing sequence.

After obtaining the writing sequence, the various subdata may be written into the OTP memory sequentially according to the writing sequence. When the writing of the subdata is performed, the various subdata may be written into continuous storage spaces of the OTP memory according to the writing sequence, for example, based on the target data X of the previous instance, when the writing sequence thereof is 4231, firstly the fourth subdata "D" may be written into a certain storage area in the OTP memory, and all the remaining subdata may be written into a next storage area, namely the second subdata "B", the third subdata "C" and the fourth subdata "A" are written sequentially. Of course, it is also possible to respectively write the various subdata into each individual storage space sequentially according to the writing sequence, for example, in the previous instance, it is possible to firstly write the fourth subdata "D" into the first storage space, and then write the second subdata "B", the third subdata "C" and the fourth subdata "A" into the second storage space, the third storage space and the fourth storage space sequentially.

It should be noted that in this example, the storage space described above may be one specific physical address or an area formed by a plurality of continuous physical addresses, and specifically, without limitation herein, may be selected according to a data volume that the physical addresses may store and a data volume of the subdata.

103. Locking the writing sequence, or prohibiting execution of an action for generating the writing sequence after determining that the writing operation is executed on all the subdata.

With regard to data writing for the OTP memory, data writing modes may be divided into analog writing and actual writing. During the analog writing, the written data is only realized by analog, and burning and fusing are not actually executed in the actual OTP memory; while during the actual writing, the written data is burnt in the OTP memory, namely fusing or non-fusing operation is performed on various units in the OTP memory, and at this moment, the OTP memory can only be read and cannot be changed. Therefore, after the data is actually written, in order to prevent the read data from being different from the target data caused by tampering with the writing sequence required during reading, it is generally necessary to lock the writing sequence, namely lock the writing sequence into a designated register which has a locking effect, and any modification action may be prohibited, or re-execution of the action for generating the writing sequence in the OTP memory may be prohibited.

Through this step, after the actual writing operation, the writing sequence is locked, or action for generating the writing sequence is prohibited, and it can be ensured that the writing sequence does not change any more after the actual writing, so that when the reading operation is executed on the data, the target data can be correctly read according to the current writing sequence. On the one hand, by locking the writing sequence, the writing sequence may be fixed from a data perspective, thereby avoiding the influence of misoperation or tampering of the writing sequence during subsequent reading; and on the other hand, after action for generating the writing sequence is prohibited, the writing sequence is actually fixed from an operation action perspective, and then the influence of misoperation or tampering of the writing sequence by others during subsequent reading is avoided.

Figure 2:
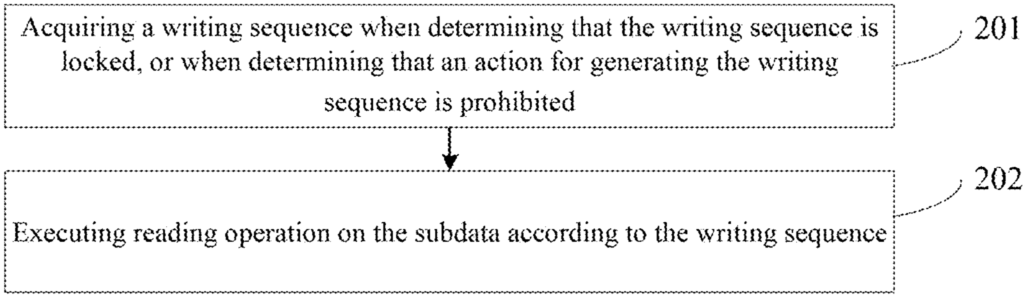
FIG. 2 shows a flowchart of a data reading method provided by an example of the present application.

An example of the present application further provides a data reading method, wherein in a reading process, as specifically shown in FIG. 2, the method includes:

201. acquiring a writing sequence when determining that the writing sequence is locked, or when determining that an action for generating the writing sequence is prohibited, wherein the writing sequence is a sequence of a plurality of subdata contained in target data when writing operation is executed.

For example, during data writing, the data may be virtually written or may be actually written. When the data is virtually written, various storage units of an OTP memory are not burnt, only when the data is actually written, the various storage units of the OTP memory is burnt, and at this moment, it is necessary to read the data in the OTP memory. Since after the data is actually written, in order to prevent the writing sequence required during reading from being tampered with, the writing sequence is locked, or the OTP memory is prohibited from generating the writing sequence again, it is possible to determine whether the data is actually written into the OTP memory, namely determine whether data reading starts, by determining whether the writing sequence is locked, or whether action for generating the writing sequence is prohibited before the data reading.

According to this step, when determining that the writing sequence is locked, or the action for generating the writing sequence is prohibited, it is showed that the actual writing is indeed executed previously, namely the OTP memory is indeed burnt, it is determined that there is no possibility of tampering with the writing sequence, and then the writing sequence may be acquired before the data reading starts.

It is easy to understand that when the target data is written into the OTP memory, the various subdata contained in the target data is stored in the addresses of the OTP memory according to the writing sequence, and if the reading is directly performed according to a forward sequence of physical addresses in the memory, there will be a difference in the sequence of the subdata between the read data and the original target data. Therefore, during data reading, it is still necessary to depend on the writing sequence.

For example, the writing sequence may be generated by randomly re-sorting the various subdata, the writing sequence may be stored in a special register or storage space of the OTP memory, or the writing sequence may be sent to a user in the form of a prompt message and the like when the user executes reading operation, namely the user may acquire the writing sequence in a direct mode in the above case.

In some cases, the mode in which the writing sequence is acquired is indirectly acquired through a certain algorithm or a certain mode. For example, the writing sequence may be generated by re-sorting the various subdata according to a preset rule, and in this case, the writing sequence may be acquired by generating the writing sequence through the preset rule.

202. Executing reading operation on the subdata according to the writing sequence.

After the writing sequence is acquired, the target data may be read according to the writing sequence.

For example, after the target data X of the previous instance is written into the memory, in the OTP memory, the data in the first storage space is the subdata "D", the data in the second storage space is the subdata "B", the data in the third storage space is the subdata "C", and the data in the fourth storage space is the subdata "A". When it is acquired that the writing sequence is 4231, firstly, according to the sequence of physical addresses of the memory, firstly the data in the fourth storage space is read, namely the subdata "A" is read and regarded as the first subdata of the target data X, namely placed at the first bit of a "queue"; then the data in the second storage space, namely the subdata "B" is read and regarded as the second subdata of the target data X, namely placed at the second bit of the "queue"; next the data in the third storage space, namely the subdata "C" is read and regarded as the third subdata of the target data X, namely placed at the third bit of the "queue"; finally the data stored in the first storage space, namely the subdata "D" is read and regarded as the fourth subdata of the target data X, namely placed at the fourth bit of the "queue"; and the "queue" being "ABCD", namely the target data X is obtained in this mode.

Since the writing sequence is unknown to a cracker, when the cracker directly cracks the data in the OTP memory through reverse engineering, the cracker can only sequentially read the subdata in various storage spaces based on the sequence of the physical addresses, namely firstly the first storage space is read to obtain the subdata "D" which is regarded as the first subdata of the target data, secondly the second storage space is read to obtain the subdata "B" which is regarded as the second subdata of the target data, then the third storage space is read to obtain the subdata "C" which is regarded as the third subdata of the target data, and finally the fourth storage space is read to obtain the subdata "A" which is regarded as the fourth subdata of the target data, thereby obtaining the cracked data being "DBCA" which is not the target data "ABCD" actually stored in the OTP memory. Therefore, the above method ensures that the data obtained by cracking is different from the original target data, thereby ensuring the security of the data.

It can be seen from the above that by writing the various subdata of the target data into the addresses of the memory according to the writing sequence different from the original arrangement sequence, when the cracker cracks the data stored in the memory through reverse engineering, since the writing sequence is not known, and the data combined after contents of various parts recorded in the memory are directly read according to the sequence of the addresses of the memory is not the stored target data, the real target data cannot be restored, thereby increasing the difficulty in cracking the data stored in the memory, and ensuring the security of data storage. Meanwhile, after the writing operation is executed, the writing sequence is also locked or the execution of the action for generating the writing sequence is prohibited, so that in a process of executing data writing each time, the problem of subsequent reading failure caused by generating the writing sequence again after completing a writing action can be avoided, and the problem of abnormal data reading caused by tampering with the writing sequence is also avoided, thereby further guaranteeing the security of data storage. In addition, in a reading process, firstly whether the writing sequence or the action for generating the writing sequence is prohibited or locked is decided, so that unnecessary reading operation caused when the writing sequence is tampered with or an analog writing action occurs in some cases can also be avoided, thereby avoiding the problem that system resources are wasted due to the unnecessary reading operation.

In order to explain in more detail below, an example of the present application provides another data writing and reading method which is applied to a data writing process and a data reading process, as specifically shown in FIG. 3, the method includes:

301. re-sorting various subdata contained in target data to generate a writing sequence, wherein the writing sequence is different from an original arrangement sequence of the subdata in the target data.

In this example, the various subdata contained in the target data is re-sorted, and a process of generating the writing sequence may be as follows: re-sorting the various subdata at least once to obtain at least one first arrangement sequence different from the original arrangement sequence as the writing sequence; and recording each of the first arrangement sequences and a corresponding arrangement sequence identifier into a sequence list if a quantity of the first arrangement sequences is multiple, based on a target number generated by a preset random number generator, searching for an arrangement sequence identifier matching the target number from the sequence list, and taking the first arrangement sequence corresponding to the arrangement sequence identifier as the writing sequence.

Specifically, in processes of re-sorting and determining the writing sequence, the processes may be implemented according to the following aspect A and aspect B, wherein in the process of sorting only once, the process may be performed according to the aspect A.

In the aspect A, re-sorting various subdata contained in target data to generate a writing sequence, includes: determining an original arrangement sequence of the various subdata in the target data, and re-sorting the various subdata to obtain a first arrangement sequence; and when the first arrangement sequence is different from the original arrangement sequence, determining the first arrangement sequence as the writing sequence.

It should be noted that the mode in which the various subdata is re-sorted is not specifically limited in the example of the present application, and the re-sorting may be performed randomly or according to a predetermined rule.

Specifically, when the various subdata contained in the target data is sorted by adopting a random mode, the sorting may be performed by virtue of a random number generator. The random number generator may be understood as a tool for generating a specified quantity of random numbers according to conditions, and a number range may be set by the random number generator to generate the random numbers quickly in batches. The random number generator described herein may generate the random numbers from a physical process or from a computer program. Specifically, the various subdata may be re-sorted based on a random number sequence generated by the random number generator to obtain the first arrangement sequence.

When the various subdata is re-sorted based on the random number sequence generated by the random number generator, the random number sequence may be obtained through the random numbers generated by the random number generator, and a range of the random number sequence may be set voluntarily as required. It is assumed that the range of the random number sequence consists of positive integers from 1 to N, wherein N may be the number of the subdata contained in the target data. Taking the target data X in the previous instance as an example, the target data X sequentially includes four subdata, namely the first subdata "A", the second subdata "B", the third subdata "C" and the fourth subdata "D", and then a random number sequence may be generated in a range of 1 to 4 by the random number generator. It is assumed that the generated random number sequence is {4, 2, 3, 1}, and then the target data X may be re-sorted as the fourth subdata "D", the second subdata "B", the third subdata "C" and the first subdata "A" to obtain "DBCA", thereby obtaining the first arrangement sequence 4231.

When the various subdata is re-sorted based on the random number sequence generated by the random number generator, the range of the generated random number sequence may not be specifically limited. The random number sequence may include items in any number not less than the number of subdata, and various items of the random number sequence may also not be integers. In this case, a new number sequence may be obtained based on a size relationship of the specified items of the random number sequence, and this number sequence satisfies that a range thereof is positive integers from 1 to N, wherein N is the number of subdata contained in the target data, and the various subdata is re-sorted based on the new number sequence. For example, the random number sequence generated by the random number generator may be {101.2, 30, 80, −50, 78, . . . }, at this moment, the number sequence {4, 2, 3, 1} is obtained by a size relationship of the first four bits of the random number sequence generated by the random number generator, therefore the target data X may be re-sorted based on the new number sequence {4, 2, 3, 1}, with a result that the re-sorted first bit is the fourth subdata "D" of the target data X, the re-sorted second bit is the second subdata "B" of the target data X, the re-sorted third bit is the third subdata "C" of the target data X, and the re-sorted fourth bit is the first subdata "A" of the target data X, and the first arrangement sequence 4231 is obtained.

In addition, the re-sorting of the various subdata may also be performed according to a certain predetermined rule. For example, reverse sorting of the various subdata of the target data may be specified to obtain a first arrangement sequence. The logic and method for specific execution of the preset rule are not limited herein, and it is sufficient to merely ensure that the mode can enable the sequence obtained after the various subdata of the target data is sorted to be different from the original arrangement sequence among the various subdata in the original target data.

After the re-sorting is performed, since in some cases the obtained first arrangement sequence may be the same as the original arrangement sequence of the various subdata in the target data, in order to prevent the target data stored in this mode from being cracked, at this moment, it is also necessary to redetermine the first arrangement sequence. For example, when the various subdata is sorted based on the random number sequence generated by the random number generator, the generated random number sequence may be {1, 2, 3, 4}, at this moment, the sequence of the various re-sorted subdata, namely the first arrangement sequence, is still the original arrangement sequence 1234 of the various subdata in the target data, and then it is necessary to redetermine the first arrangement sequence.

For example, the various subdata is re-sorted again based on the random number sequence generated by the random number generator; and a new first arrangement sequence may also be obtained by adjusting the first arrangement sequence the same as the original arrangement sequence, for example, a rule may be set to exchange the sequences of the first subdata and the last subdata in the target data when the first arrangement sequence is the same as the original arrangement sequence, which is not specifically limited in the example of the present application.

By determining the first arrangement sequence different from the original arrangement sequence as the writing sequence, it is ensured that the writing sequence is different from the original arrangement sequence of the various subdata in the target data, so as to avoid the effect of directly reading the target data from the OTP memory by the cracker since the writing sequence is the same as the original arrangement sequence when the arrangement sequence obtained after the re-sorting is performed is the same as the original arrangement sequence and is taken as the writing sequence, thereby increasing the difficulty in cracking the target data, and ensuring the security of storage.

However, after the re-sorting is performed multiple times, the execution process may be as shown in the aspect B.

In the aspect B, re-sorting various subdata contained in target data to generate a writing sequence, includes: re-sorting the various subdata contained in the target data multiple times, and generating a sequence list, wherein the sequence list contains a plurality of second arrangement sequences, and the second arrangement sequence is an arrangement sequence of the subdata obtained by re-sorting each time; and a target number is generated based on a preset random number generator, and the second arrangement sequence corresponding to the target number is determined as the writing sequence in the sequence list.

In this example, the second arrangement sequences are a plurality of sequences of the various subdata obtained by re-sorting the various subdata contained in the target data multiple times. One second arrangement sequence may be generated by different re-sorting of the various subdata each time. The sequence list may consist of the plurality of second arrangement sequences. The number of the second arrangement sequences in the sequence list is not specifically limited in the example of the present application.

For the target data X in the previous instance, respective sorting may be performed according to the method in this step as follows: after the first re-sorting, a sorting mode for the various subdata is the first subdata "A", the fourth subdata "D", the third subdata "C" and the second subdata "B" of the target data X; after the second re-sorting, a sorting mode for the various subdata is the fourth subdata "D", the first subdata "A", the third subdata "C" and the second subdata "B" of the target data X; and after the third re-sorting, a sorting mode for the various subdata is the fourth subdata "D", the third subdata "C", the first subdata "A" and the second subdata "B" of the target data X, thereby obtaining the second arrangement sequences 1432, 4132 and 4312, and obtaining the sequence list [1432; 4132; 4312].

In this example, the preset random number generator may be the aforementioned random number generator. The range of the target numbers generated based on the preset random number generator may be positive integers from 1 to N, wherein N is the number of the second arrangement sequences in the sequence list. Taking the sequence list [1432; 4132; 4312] in the previous instance as an example, it is assumed that the target number obtained by the current preset random number generator is 2, the second arrangement sequence "4132" at the second bit in the sequence list may be determined as the writing sequence based on the target number 2.

In some cases, if the target number generated by the preset random number generator is not preset to be obligatorily within an upper limit for the quantity of the second arrangement sequences, for example, when the number of the second arrangement sequences in the sequence list is 4 and the generated target number is 9, in this case, the writing sequence may be determined as the second arrangement sequence at the first bit in the sequence list by dividing the number of the second arrangement sequences into the generated target number to obtain the remainder, namely by dividing "4" into "9" to obtain the remainder "1", thereby indicating that the second arrangement sequence at the first bit in the sequence list will be determined as the writing sequence.

In addition, the process of re-sorting the various subdata multiple times may also be performed according to a preset rule or a preset algorithm, for example, a new arrangement sequence is obtained by shifting the last subdata forwards by one bit each time; random re-sorting may also be performed multiple times; and in this regard, the re-sorting may be performed in various modes including, but not limited to, those shown above, which are not specifically limited in the example of the present application.

The writing sequence is generated based on the target number and the sequence list, namely a plurality of second arrangement sequences are provided in the form of the sequence list, and one of the second arrangement sequences is determined as the writing sequence by the target number, so that even if the cracker knows that the various subdata is written according to the sequence different from the original arrangement sequence thereof in the target data, it is also difficult to deduce the writing sequence by clues such as reverse sorting of the subdata. Meanwhile, since the writing sequence is determined according to the target number and the sequence list in this step, it is also ensured that even if the target number is leaked, it is also difficult to know the writing sequence. In the same way, even if the cracker acquires the sequence list, it is also difficult to quickly determine the actual writing sequence in the case where a large number of alternative "writing sequences" are contained in the sequence list, and the time taken for cracking may be increased, so as to facilitate the timely replacement of new target data as a new secret key or pass verification information by a holder of the target data, and ensure the security of the data. In addition, the target data is randomly generated by the preset random number generator, rather than artificially set according to a certain rule, namely, it is difficult for the cracker to simulate and repeat the execution to acquire the target number, so that the difficulty in acquiring the writing sequence is further increased, thereby increasing the difficulty in cracking the target data, and ensuring the security of storage.

Specifically, in order to ensure that the re-sorting can be executed according to a certain standard each time, it is possible to consider adopting a certain fixed algorithm for executing the re-sorting, and based on this, the various subdata is re-sorted at least once, including: re-sorting the various subdata contained in the target data multiple times by preset algorithms, wherein the preset algorithm selected during re-sorting each time includes one of a bubble sort algorithm, an insertion sort algorithm and a selection sort algorithm.

In this example, the preset algorithms may include the bubble sort algorithm, the insertion sort algorithm and the selection sort algorithm. Specifically, since the original arrangement sequence of the various subdata in the target data is a forward sequence, namely an arrangement sequence from small to large. Since during sorting by the above several algorithms, actually a final sorting result is obtained after executing the operation in multiple rounds, but the target data is not re-sorted by only utilizing the final sorting result in the example of the present application, and the sorting result obtained in each round may be taken as the second arrangement sequence in this example in the process of performing the sorting multiple times based on the above several algorithms. Therefore, reverse sorting may be performed on the original forward sequence by the above algorithms, namely the arrangement sequence from small to large is converted into an arrangement sequence from large to small. In this process, with regard to the generated intermediate arrangement sequences and final arrangement sequences, any one, or several or even all may be selected as the second arrangement sequences, and the quantity and sequence of the selected intermediate arrangement sequences and final arrangement sequences are not specifically limited in the example of the present application.

With regard to the bubble sort algorithm, a core concept thereof is that with regard to n elements, left and right elements in the arrangement sequence are compared sequentially to ensure that the element on the right side is always less than the element on the left side, so that after one round ends, the last element in the arrangement sequence must be a minimum value of the current arrangement sequence; then the above left-right element comparison step is executed on the remaining n−1 elements in the arrangement sequence again; and the comparison is executed in a total of n−1 rounds.

For example, with regard to the target data with the original arrangement sequence of 1234, firstly in the left-right element comparison in the first round, intermediate arrangement sequences: 2134, 2314, 2341 may be obtained sequentially; then in the left-right comparison in the second round, intermediate arrangement sequences: 3241, 3421 may be obtained sequentially; and finally in the left-right comparison in the last round, a final arrangement sequence: 4321 may be obtained.

Therefore, in the process of the above multiple rounds of operation executed based on the bubble sort algorithm, the arrangement sequence obtained in any round may be selected as the writing sequence of this example, namely any one, or several or even all of 2134, 2314, 2341, 3241, 3421 and 4321 may be selected in a plurality of arrangement sequences described above as the second arrangement sequences, for example, the first three arrangement sequences may be selected as the second arrangement sequences to obtain a sequence list which is specifically as follows: [(1, 2134), (2, 2314), (3, 2341)].

With regard to the insertion sort algorithm, a core concept thereof is that all the elements in the arrangement sequence are compared sequentially with the previously sorted elements, and if the selected element is greater than the sorted element, exchange is performed until all the elements are compared.

For example, with regard to the target data with the original arrangement sequence of 1234, in the first round of sorting, the selected element only contains 1, while the arrangement sequence of the unselected elements remains unchanged and is 234, so as to obtain an initial arrangement sequence of 1234; in the second round of sorting, a new element 2 is added to the selected element 1, with regard to the selected elements, the arrangement sequence thereof is 21, and at this moment, the arrangement sequence of the unselected elements is 34, so as to obtain an intermediate arrangement sequence 2134; in the third round of sorting, a new element 3 is added to the selected elements 1 and 2, with regard to the selected elements, the arrangement sequence thereof is 321, and the unselected element is 4, so as to obtain an intermediate arrangement sequence 3214;

and in the last round of sorting, a new element 4 is added to the selected elements 1, 2 and 3 to obtain a final arrangement sequence 4321.

Therefore, in the process of the above multiple rounds of operation executed based on the insertion sort algorithm, the arrangement sequence obtained in any round may be selected as the writing sequence of this example, namely any one, or several or even all of 2134, 3214 and 4321 may be selected in a plurality of arrangement sequences described above as the second arrangement sequences, for example, all of the arrangement sequences may be selected as the second arrangement sequences to obtain a sequence list [(1, 2134), (2, 3214), (3, 4321)].

With regard to the selection sort algorithm, a core basic concept thereof is that with regard to n elements, firstly the largest element is found from the arrangement sequences to be sorted, and if the largest element is not the first element in the arrangement sequences to be sorted, the largest element is exchanged with the first element; and the largest element is found from the remaining n−1 elements, and the previous finding and exchanging steps are repeated until the sorting ends.

For example, with regard to the target data with the original arrangement sequence of 1234, in the first round of sorting, the largest element 4 is selected, and the arrangement sequence of the remaining elements is 123 to obtain an intermediate arrangement sequence 4123; in the second round of sorting, the largest element 3 is selected from the remaining elements 1, 2 and 3, then the arrangement sequence of the selected elements is 43, and the arrangement sequence of the remaining elements is 12, so as to obtain an intermediate arrangement sequence 4312; and in the last round of sorting, the largest element 2 is selected from the remaining elements 1 and 2, the arrangement sequence of the selected elements is 432, and the arrangement sequence of the remaining element is 1, so as to obtain a final arrangement sequence 4321.

Therefore, in the process of the above multiple rounds of operation executed based on the selection sort algorithm, the arrangement sequence obtained in any round may be selected as the writing sequence of this example, namely any one, or several or even all of 4123, 4312 and 4321 may be selected in a plurality of arrangement sequences described above as the second arrangement sequences, for example, all of the arrangement sequences may be selected as the second arrangement sequences to obtain a sequence list [(1, 4123), (2, 4312), (3, 4321)].

The various subdata contained in the target data is re-sorted multiple times by the preset algorithms, namely different arrangement sequences are generated according to certain rules, so as to ensure that in the process of executing the re-sorting according to the above several algorithms, a certain quantity of arrangement sequences may be obtained through multiple rounds of execution, so as to constitute the sequence list, namely when the method of this example is executed once, at least a certain quantity of arrangement sequences can be obtained, so that a process of manually compiling a sorting plug-in or function can be avoided, and the existing algorithms may be used for directly running, thereby also improving the convenience in executing the method of this example while ensuring the security of data. Of course, in implementation processes of the methods executed in this step, the arrangement sequence obtained by re-sorting according to any one of the above methods may be taken as the second arrangement sequence and build the corresponding sequence list.

In addition, in the process of re-sorting based on the above algorithms, the same arrangement sequence can be prevented from appearing in the sequence list as the second arrangement sequence, so as to reduce the probability that a certain one is taken as the writing sequence in the case where the same second arrangement sequences exist, thereby ensuring that when each second arrangement sequence in the sequence list is randomly determined as the writing sequence, the same second arrangement sequences cannot be taken as the writing sequence multiple times, so that the probability is relatively average, and the difficulty in cracking the writing sequence is further increased, thereby increasing the difficulty in cracking the target data, and ensuring the security of storage.

Further, since arrangement sequence identifiers of the sequence list may also be not only Arabic numbers, and may also be identifiers in other forms, for example, the above sequence list obtained by the selection sort algorithm may also be expressed as [a: 4123; b: 4312; c: 4321]. In this case, the writing sequence corresponding to the target number may be determined based on a preset relationship between each number and the corresponding identifier.

Based on this, generating a target number based on a preset random number generator, and determining a second arrangement sequence corresponding to the target number as a writing sequence in a sequence list, includes: generating a target number based on a preset random number generator, and determining a target arrangement sequence identifier corresponding to the target number in a plurality of arrangement sequence identifiers in a sequence list; and determining a second arrangement sequence corresponding to the target arrangement sequence identifier as a writing sequence.

In this example, the corresponding relationship between the number and the arrangement sequence identifier in the sequence list is preset, and taking the previous sequence list [a: 4123; b: 4312; c: 4321] as an example, if the number 1 corresponds to a, the number 2 corresponds to b, and the number 3 corresponds to c, when the target number is 2, 4312 corresponding to the arrangement sequence identifier b may be determined as the writing sequence in the sequence list based on the corresponding relationship between 2 and b. In addition, in this example, the corresponding relationships between the numbers and the arrangement sequence identifiers of the sequence list may be stored in the OTP memory in the form of a mapping table and the like. The arrangement sequence identifier may be determined based on the target number, and therefore the second arrangement sequence corresponding to the arrangement sequence identifier is determined as the writing sequence.

By setting the arrangement sequence identifiers in the sequence list, there is the corresponding relationships between the arrangement sequence identifiers and the numbers, even if in the case where the cracker knows the target number and the sequence list, it is difficult to directly determine which one of a plurality of alternative "writing sequences" is the actual writing sequence through the target number and the arrangement sequence identifier due to the unknown corresponding relationship between the two, namely it is impossible to directly determine the writing sequence in a plurality of second arrangement sequences based on the target number, thereby further improving the security of data storage.

302. Executing writing operation on the subdata according to the writing sequence.

In order to further increase the difficulty in cracking the target data and improve the security of the OTP memory, in this example, it is also possible to consider adding a placeholder in the writing process. In this way, the entire written "data" as a whole contains not only a target data portion, but also a placeholder portion, so that the placeholder portion is likely to be recognized as the content of the target data subsequently in the case where the cracker does not know the existence of the placeholder.

For example, executing writing operation on the subdata according to the writing sequence, includes: setting a corresponding idle character for each of the subdata when writing the subdata according to the writing sequence; and writing the idle character into a next storage address adjacent to a storage address after writing each of the subdata into the storage address.

Based on physical properties of the OTP memory, in the process of storing data in the OTP memory, whether a unit is fused or not is used for representing the specific content, for example, fusing the unit is used for representing a character "1", not fusing the unit is used for representing a character "0", and then the idle character is specifically expressed as not fusing the unit in a storage unit of the OTP memory. Of course, for the cracker without knowing the meaning of the idle character, the unfused unit may be recognized by the cracker as the character 0. Therefore, the placeholder may be understood to confuse a portion of "content" into the target data without processing the unit of the memory. With regard to a specific implementation mode for adding the idle character, it is possible to firstly write the subdata into the OTP memory, and then write the idle character corresponding to the subdata into the next storage address adjacent to the storage address storing the subdata. How to specifically execute the addition of the idle character is not specifically limited in the example of the present application.

Since fusing operation is not performed on the storage unit storing the idle character, meanwhile in the process of data recording, in some cases the fusing operation is also not performed in the mode for recording data 0, then when the cracker reads the idle character, the cracker cannot distinguish whether the portion on which the fusing operation is not performed is the idle character or the subdata, and the idle character may be recognized as the subdata and recorded, so that the finally recognized data is different from the target data, and the target data actually written cannot be obtained, thereby increasing the difficulty in cracking the data stored in the OTP memory, and further ensuring the security of data storage.

Further, since the idle character itself belongs to the unit which is not operated, namely the addition of additional data may be performed subsequently, the size of the idle character may also be adjusted as required in view of standby modification, data addition and other aspects, and based on this, the number of bytes of the idle character may be greater than or equal to the number of bytes of the corresponding subdata.

For example, the number of bytes of the idle character is set to be greater than or equal to the number of bytes of the corresponding subdata, which is equivalent to reserving a backup space for the subdata, and when the storage address cannot work normally due to a manufacturing defect or damage of the unit storing the subdata, the subdata may be written into the space of the idle character corresponding to the subdata.

303. Locking the writing sequence, or prohibiting execution of an action for generating the writing sequence after determining that the writing operation is executed on all the subdata.

Based on the description of the previous example, it can be seen that the data writing for the OTP memory may be divided into analog writing and actual writing. During the analog writing, burning and fusing are not actually executed in the OTP memory; while during the actual writing, the written data is burnt in the OTP memory, namely fusing or non-fusing operation is executed on various units in the OTP memory.

After the data is actually written, in order to prevent the read data from being different from the target data caused by tampering with the writing sequence required during reading, it is generally necessary to lock the writing sequence. For example, the writing sequence is latched into a designated register which has a locking effect, and any modification action may be prohibited, or re-execution of the action for generating the writing sequence in the OTP memory may be prohibited.

Specifically, locking the writing sequence, or prohibiting execution of an action for generating the writing sequence after determining that the writing operation is executed on all the subdata, includes: locking the writing sequence by locking the target number, or prohibiting the execution of the action for generating the writing sequence by prohibiting a function of the preset random number generator after determining that the writing operation is executed on all the subdata.

The writing sequence itself may be taken as a type of data, and may be set to be in an unalterable state in the process of locking. Meanwhile, since the writing sequence itself is determined based on the target number generated by the preset random number generator, when locking the writing sequence, the target number may be specifically locked, or the function of the preset random number generator may be locked in the process of prohibiting the generation of the writing sequence, so that the effect of locking the writing sequence or prohibiting the action for generating the writing sequence can be achieved.

Specifically, in the solution of determining the writing sequence based on the target number, when locking the target number, the target number may be latched into the designated register on which modification operation cannot be executed; while when prohibiting the execution of the action for generating the writing sequence, the prohibition may be performed based on a locking mode of the preset random number generator, since the preset random number generator is locked, the preset random number generator cannot be started to generate the target number, and then the subsequent process of determining the writing sequence based on the target number is not involved, which is equivalent to prohibiting the action for determining the writing sequence based on the function of the preset random number generator.

Of course, in practical applications, the preset random number generator may also be stored in the previous designated register, so that the locking effect of the preset random number generator can be achieved based on the property possessed by the designated register that modification operation and other operation actions cannot be executed.

In one instance, the writing sequence is determined based on the target number and the sequence list, and therefore locking of the writing sequence is achieved by the locking of the target number. Meanwhile, in case where the number of bytes of the target number is less than the number of bytes of the writing sequence, the locking of the target number can achieve the purpose of locking the writing sequence by storing and locking fewer characters relative to the writing sequence, thereby saving the space and processing resources of the OTP memory. In the same way, prohibiting the generation of a new target number, namely prohibiting the generation process of a new writing sequence, may be achieved by locking the preset random number generator, so that prohibiting the action for generating the writing sequence in a locking mode of the preset random number generator requires fewer system resources than prohibiting the generation action, thereby reducing the occupied system resources of the OTP memory.

304. Acquiring a writing sequence when determining that the writing sequence is locked, or when determining that an action for generating the writing sequence is prohibited, wherein the writing sequence is a sequence of a plurality of subdata contained in target data when writing operation is executed, and the writing sequence is different from an original arrangement sequence of the subdata in the target data.

Since in a reading process, whether the writing sequence is correct or not will affect whether the finally read data is the target data, namely whether the original target data can be restored from the memory, before acquiring the writing sequence, it is also necessary to decide whether the writing sequence is locked, or whether the action for generating the writing sequence is prohibited.

Since during data writing, the data may be virtually written, and the data may also be actually written. When the data is virtually written, various storage units of the OTP memory are not burnt, only when the data is actually written, the various storage units of the OTP memory are burnt, and at this moment, it is necessary to read the data in the OTP memory.

Since after the data is actually written, in order to prevent the writing sequence required during reading from being tampered with, the writing sequence is locked, or the OTP memory is prohibited from generating the writing sequence again, before the data reading, whether the data is actually written into the OTP memory is determined by determining whether the writing sequence is locked, or whether the action for generating the writing sequence is prohibited, namely whether to start the data reading is determined.

When determining that the writing sequence is locked, or the action for generating the writing sequence is prohibited, it is showed that the actual writing is indeed executed previously, namely the OTP memory is indeed burnt, it is determined that there is no possibility of tampering with the writing sequence, and then the writing sequence may be acquired before the data reading starts.

A specific method for acquiring the writing sequence may be acquired in different modes according to different methods for generating the writing sequence.

For example, when the writing sequence is generated by re-sorting the various subdata contained in the target data according to a specified rule in the previous step, the writing sequence may be acquired again according to the specified rule; when the writing sequence is generated by the random number sequence generated by the random number generator in the previous step, the writing sequence may be acquired by the designated register in the OTP memory or the locked random number generator, and the like; and the writing sequence may be acquired even in a mode of reading the register storing the writing sequence, or may be directly acquired in a mode of receiving a message containing the writing sequence when transmission is performed in a mode of forwarding the writing sequence in advance in the previous step.

Specifically, based on the description of the previous step, it can be seen that in one embodiment, the writing sequence is determined by acquiring the arrangement sequence of the subdata corresponding to the target number in the sequence list based on the target number generated by the preset random number generator; wherein the sequence list includes the arrangement sequence of each of the subdata and the corresponding arrangement sequence identifier. Then at this moment, in this step, when determining that the writing sequence is locked, or the action for generating the writing sequence is prohibited, the arrangement sequence of the subdata corresponding to the target number is acquired in the sequence list based on the target number as the writing sequence.

When determining that the writing sequence existing in the form of data is locked, it is confirmed that the writing sequence is in the unalterable state, meanwhile since the writing sequence is determined based on the target number generated by the preset random number generator and based on different arrangement sequence identifiers in the sequence list, when determining that the writing sequence is locked or the action for generating the writing sequence is prohibited, it is specifically confirmed that the target number is locked or the preset random number generator is locked, so that the determination of locking the writing sequence or prohibiting the action for generating the writing sequence can be achieved. Moreover, based on the previous description, it can be seen that since the writing sequence may be determined from the arrangement sequence of a plurality of subdata in the preset sequence list, and then in this step, after the target number is acquired by the previous method, the writing sequence may also be determined by combining the sequence list based on the target number.

Based on the description of the previous step, it can be seen that since in the process of executing the writing operation, the writing sequence may be determined from the arrangement sequence of a plurality of subdata in the sequence list based on the target number, then in the reading process, when the target number is acquired, the writing sequence may also be acquired in the same mode, which is equivalent to simulating the process of determining the writing sequence again based on the target data, thereby achieving the acquisition of the writing sequence. In this way, it is ensured that even if the target number is leaked, the cracker still cannot know the correct writing sequence in the case where the sequence list is unknown, thereby improving the security of the OTP memory.

Further, based on the previous step, it can be seen that since the arrangement sequence identifiers in the sequence list may not be numbers, and may also be other characters, such as English characters, Greek characters, Roman characters and other types of characters, in this case, the sequence list includes the arrangement sequence of each of the subdata and the corresponding arrangement sequence identifier. Moreover, there is a corresponding relationship between the numbers corresponding to each arrangement sequence character.

Based on this, acquiring the arrangement sequence of the subdata corresponding to the target number in the sequence list based on the target number as the writing sequence, includes: acquiring an arrangement sequence identifier corresponding to the target data in the sequence list as a target arrangement sequence identifier, and determining the subdata corresponding to the target arrangement sequence identifier as the writing sequence.

In some cases, since the target number may have a corresponding relationship with the arrangement sequence identifier of the sequence list, for example, the target number and the arrangement sequence identifier of the sequence list may be stored in the OTP memory in the form of a mapping table and the like, the corresponding arrangement sequence identifier may be determined as the target arrangement sequence identifier based on the target number and the mapping table, and therefore the arrangement sequence of the subdata corresponding to the target arrangement sequence identifier is determined as the writing sequence.

It should be noted that in this example, the same concept is used between the arrangement sequence of the subdata in this step and the second arrangement sequence in the previous step, the arrangement sequence and the second arrangement sequence are both obtained after the subdata in the sequence list is re-sorted, and the name difference between the two is merely used for descriptive convenience herein.

Since the arrangement sequence identifier is set in the sequence list, namely there is the corresponding relationship between the arrangement sequence identifier and the number, in the reading process, even if the sequence of the arrangement sequences of the various subdata in the sequence list changes, the corresponding arrangement sequence identifier may still be determined according to the target number, so that the arrangement sequence of the subdata corresponding to the arrangement sequence identifier is determined as the writing sequence, and it is ensured that in some cases, when a user needs to disturb the arrangement sequence of the various subdata in the sequence list, the correct writing sequence can still be found subsequently in the reading process, thereby further increasing the difficulty in cracking the writing sequence in the case where the accuracy of reading is ensured when executing the reading operation on the data, and improving the security of data storage on the whole.

305. Executing reading operation on the subdata according to the writing sequence.

Executing reading operation on the subdata according to the writing sequence may be performed in the following two modes of extracting all of the subdata at one time and then sorting the subdata to obtain the target data, or extracting the various subdata sequentially and then combining the subdata to obtain the target data:

mode I. extracting all of the subdata, and sorting the subdata based on the writing sequence to obtain the target data; and mode II. extracting the corresponding subdata sequentially according to the writing sequence, and obtaining the target data after extracting all of the subdata.

With regard to the mode I, in conjunction with the previous instance, it can be seen that when determining that the writing sequence of the target data X is 4231, the subdata "D" in the first storage space, the subdata "B" in the second storage space, the subdata "C" in the third storage space and the subdata "A" in the fourth storage space may be simultaneously extracted by the method of the mode I to obtain the subdata "D", the subdata "B", the subdata "C" and the subdata "A", and then the subdata "D", the subdata "B", the subdata "C" and the subdata "A" are re-sorted according to the writing sequence 4231, namely the subdata "D" is taken as the fourth subdata of the "queue" formed by the re-sorted subdata, the subdata "B" is taken as the second subdata, the subdata "C" is taken as the third subdata and the subdata "A" is taken as the first subdata, thereby obtaining the "queue" formed by the re-sorted subdata, which is sequentially as follows: the first subdata being the subdata "A", the second subdata being the subdata "B", the third subdata being the subdata "C" and the fourth subdata being the subdata "D", and then "ABCD", namely the target data X is obtained.

By firstly extracting all of the subdata and then obtaining the target data based on the writing sequence, the integrity of the subdata may be ensured, namely the problem of missing individual subdata during extraction due to the situations such as individual power-off cannot occur.

In addition, the reading mode in this example is actually equivalent to splitting the whole process of data reading into two parts, namely an extraction process and a sorting process, and in this case, it is actually possible to terminate the execution process of the two parts as required according to the requirements of the user, namely it is possible to firstly extract all of the subdata and then perform interruption, and perform sorting based on the writing sequence when required, thereby enabling the whole reading process to be more flexible and controllable.

With regard to the mode II, in conjunction with the previous instance, it can be seen that when the writing sequence of the target data X is 4231, by the method of the mode II, it can be determined that "DBCA" is known according to the forward sequence of physical addresses based on the writing sequence, in this case, the first subdata "A" in the fourth storage space may be firstly extracted, then the second subdata "B" in the second storage space, the third subdata "C" in the third storage space and the fourth subdata "D" in the first storage space may be extracted, and then the "queue" of the data obtained in this way is sequentially determined while the extraction is performed, namely "ABCD", which is the target data X.

By sequentially extracting the corresponding subdata according to the writing sequence until all of the subdata is extracted, it can be ensured that in the process of extracting the subdata, it is equivalent to sorting the various subdata according to the original arrangement sequence. In this way, relative to other modes of reading, in the case where the data volume of the target data is relatively large, the contents of the "queue" formed by a part of the subdata which is extracted firstly may be parsed, so that in the process of reading the data by the user, the data contents can be parsed and recognized simultaneously without waiting for all the subdata being extracted, thereby improving the efficiency of data reading.

Specifically, it can be seen from the description of the previous step that since the idle character is also synchronously added when the writing operation is executed in practical applications, in order to ensure that the extracted data may be finally restored into the target data, a processing process of the idle character needs to be considered in the reading process. Meanwhile, based on the description of this step, it can be seen that since the reading process may be performed in the above two modes I and II, based on this, the processing process of the idle character in the reading process may also be performed in the following two modes:

With regard to the mode I, when determining that the memory storing the subdata also stores the idle character corresponding to the subdata, data containing all of the subdata and all the corresponding idle characters is extracted as the extracted data; and in the extracted data, a position of the idle character corresponding to each of the subdata in the extracted data and a data volume of the idle character are determined, and all of the idle characters are deleted based on the position of each idle character in the extracted data and the data volume of each idle character to obtain all of the subdata, and the subdata are sorted according to the writing sequence to obtain the target data.

When reading is performed according to the mode I, it is actually to extract all the contents in the storage space covered by the target data and the placeholder in the OTP memory, then in this process, with regard to the placeholder formed by not performing operation on the unit, it is also equivalent to being extracted as data, thereby resulting in that interference data formed by the placeholder is actually contained in the extracted data, in this example, the position of the placeholder corresponding to each of the subdata in the extracted data may be determined based on the corresponding relationship between each of the subdata and the idle character, namely the data contents in the extracted data are taken as a "queue" formed by the arrangement sequence of characters. In this "queue", the position where each placeholder is actually located is actually related to the position of the storage space where the placeholder is added when the writing operation is performed in the previous step.

Based on the previous step, it can be seen that since the placeholder is stored in the next storage space adjacent to the storage space in which the corresponding subdata is stored, namely the address adjacent to the address in which each of the subdata is stored stores the placeholder corresponding to the subdata, the placeholder is the "data" adjacent to each of the subdata in the "queue" in the extracted data, namely the position of the placeholder in the extracted data; while since the whole extracted data is taken as the "queue", in addition to determining each starting position when deleting the placeholder, it is also necessary to determine the "length" thereof, and then with regard to the placeholder, the impact on the "length" thereof in the "queue" is actually determined by the size of the data amount.

Therefore, in this example, after the position of the placeholder is determined, it may be determined based on the data volume thereof that the characters contained from which character to which character in the "queue" are actually the contents of the placeholders, and so on, the distribution of the placeholders respectively corresponding to all the subdata in the extracted data in the "queue" may be determined, the deletion is performed based on this, the data obtained after the deletion is the data not containing the placeholders, namely the data completely constituted by the subdata, and next the position of each of the subdata may be determined again according to the writing sequence in the mode of this step, thereby obtaining the target data.

In the case where the idle character is added when the target data is written, at this moment, in the reading process, it is necessary to firstly extract all the information in the memory, then delete the idle characters, and finally obtain the target data based on the writing sequence, so that it can be ensured that the extracted data can improve the security of the target data due to the idle characters in the case where the extracted data is leaked. Meanwhile, the idle characters in the extracted data are deleted based on the positions and the data volumes of the idle characters, so as to ensure that the distribution of the idle characters in the extracted data is accurately determined in the process of deleting the idle characters, thereby laying a foundation for accurately extracting all of the subdata corresponding to the target data.

With regard to the mode II, when determining that the memory storing the subdata also stores the idle character corresponding to the subdata, the storage address of each of the subdata in the memory is determined, and each of the subdata is sequentially extracted according to the storage address and the writing sequence; and when determining that all the subdata is extracted, the target data is obtained.

In the case where the idle character is set when writing the subdata, it is sufficient to ensure that the reading of the idle character is avoided after the idle character is recognized in the storage space of the memory, which is equivalent to processing the idle character while reading each of the subdata to directly obtain the subdata of the target data, and since the storage address of each of the subdata is determined in the reading process, the reading may be performed directly according to the storage address, and therefore after all the subdata is sequentially extracted based on the writing sequence, the obtained data is the target data.

In the case where the idle character is added when the target data is written, the target data is obtained by sequentially extracting each of the subdata through the storage address of each of the subdata in the memory according to the storage address and the writing sequence, and it can be ensured that the extracted data is the actually written subdata when the target data is written into the OTP memory, namely the extracted data does not contain the information about the idle character, thereby avoiding the process of processing the idle character when reading all of the data, and then improving the efficiency of the whole reading process.

In some cases, when reading the internal data stored in the OTP memory, it may not be necessary to read all of the target data, and only a part of the subdata may also be read as required. Specifically, executing reading operation on the subdata according to the writing sequence, further includes: determining data to be read based on a reading instruction, wherein the data to be read includes at least one of the subdata; determining a reading sequence of the data to be read based on the writing sequence when determining that the data to be read contains at least two of the subdata, wherein the reading sequence is an arrangement sequence of the at least two of the subdata determined based on the writing sequence; and reading the subdata in the data to be read in the memory based on the reading sequence.

The instruction may include information specifying subdata needing to be read in the target data, for example, reading operation is only performed on the first subdata "A", the second subdata "B" and the third subdata "C" of the target data X in the previous instance. When the writing sequence is 4231, it can be determined that the first subdata "A", the second subdata "B" and the third subdata "C" are respectively the fourth subdata written into the OTP memory, the second subdata written into the OTP memory and the third subdata written into the OTP memory, therefore it can be determined that the reading sequence of the first subdata "A", the second subdata "B" and the third subdata "C" is 423, and then the subdata "A", the subdata B and the subdata "C" may be read from the fourth storage space, the second storage space and the third storage space to obtain "ABC".

In this mode, when the user does not need to acquire the complete target data at one time, but only needs to acquire a part of the subdata in the target data, the reading sequence may be determined only for the part of the target data needing to be acquired, and the reading operation is executed based on this, so as to avoid wasting system resources when the reading operation is executed on all of the subdata, and ensure that the read part of the subdata conforms to the writing sequence during reading simultaneously, thereby guaranteeing the accuracy of the read data contents.

It should be noted that in the example of the present application, due to the requirements of internal settings, when the OTP memory is used for storage, it may be necessary to determine the first position of the physical address for starting storage and the maximum data volume of each of the subdata allowed to be stored in one physical address. Specifically, these parameters may all be set in a macro definition file of the OTP memory, and the specific setting mode and the setting effect are not limited herein, and may be selected according to the actual requirements of the user and the performance of the OTP memory, without being specifically limited.

Figure 3:
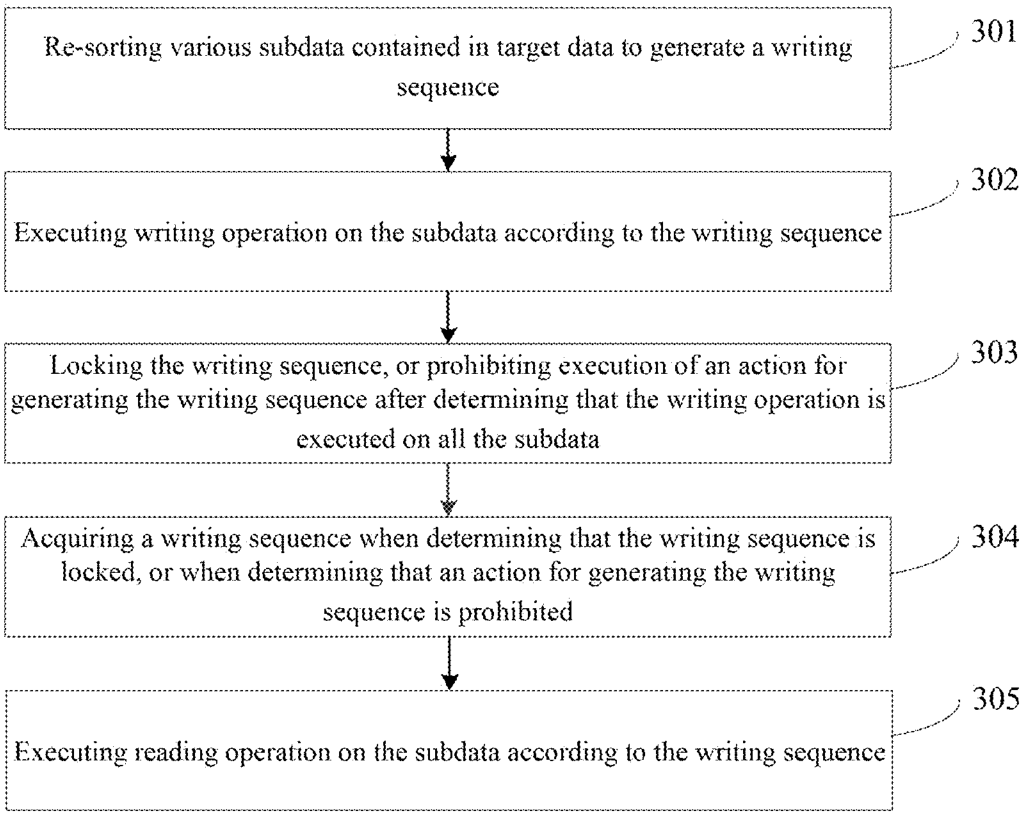
FIG. 3 shows a flowchart of a data writing and reading method provided by an example of the present application.

Further, as the implementation of the above methods shown in FIG. 1, FIG. 2 and FIG. 3, another example of the present application further provides a data writing apparatus. The example of the data writing apparatus corresponds to the previous examples of the methods, and for the convenience of reading, the detailed contents in the previous examples of the methods will not be described in detail in this example of the data writing apparatus, but it should be clear that the apparatus in this example can correspondingly implement all of the contents in the previous examples of the methods.

Figure 4:
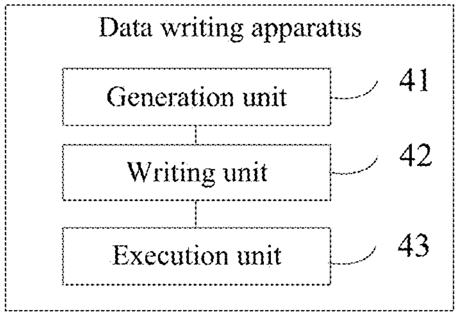
FIG. 4 shows a block diagram illustrating constitution of a data writing apparatus provided by an example of the present application.

As specifically shown in FIG. 4, the data writing apparatus includes: a generation unit 41 which may be configured for re-sorting various subdata contained in target data to generate a writing sequence, wherein the writing sequence is different from an original arrangement sequence of the subdata in the target data; a writing unit 42 which may be configured for executing writing operation on the subdata according to the writing sequence generated by the generation unit 41; and an execution unit 43 which may be configured for locking the writing sequence, or prohibiting execution of an action for generating the writing sequence after determining that the writing operation is executed on all the subdata by the writing unit 42.

Figure 5:
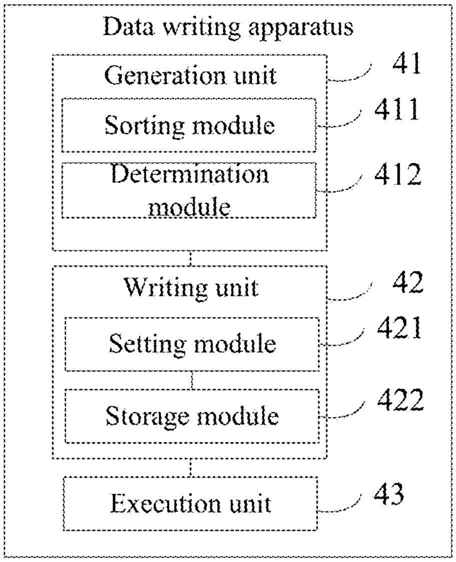
FIG. 5 shows a block diagram illustrating constitution of another data writing apparatus provided by an example of the present application.

Further, as shown in FIG. 5, the generation unit 41 includes: a sorting module 411 which may be configured for re-sorting the various subdata at least once to obtain at least one first arrangement sequence different from the original arrangement sequence as the writing sequence; and a determination module 412 which may be configured for recording each of the first arrangement sequences and a corresponding arrangement sequence identifier into a sequence list if a quantity of the first arrangement sequences is multiple, based on a target number generated by a preset random number generator, searching for an arrangement sequence identifier matching the target number from the sequence list, and taking the first arrangement sequence corresponding to the arrangement sequence identifier as the writing sequence.

Further, as shown in FIG. 5, the sorting module 411 is specifically configured for re-sorting the various subdata contained in the target data multiple times by preset algorithms, wherein the preset algorithm selected during re-sorting each time includes one of a bubble sort algorithm, an insertion sort algorithm and a selection sort algorithm.

Further, as shown in FIG. 5, the execution unit 43 may be specifically configured for locking the writing sequence by locking the target number, or prohibiting the execution of the action for generating the writing sequence by prohibiting a function of the preset random number generator after determining that the writing operation is executed on all the subdata.

Further, as shown in FIG. 5, the writing unit 42 includes: a setting module 421 which may be configured for setting a corresponding idle character for each of the subdata; and a storage module 422 which may be configured for writing the idle character into a next storage address adjacent to a storage address after writing each of the subdata into the storage address, wherein a number of bytes of the idle character is greater than or equal to a number of bytes of the corresponding subdata.

Further, as the implementation of the above methods shown in FIG. 1, FIG. 2 and FIG. 3, another example of the present application further provides a data reading apparatus. The example of the data reading apparatus corresponds to the previous examples of the methods, and for the convenience of reading, the detailed contents in the previous examples of the methods will not be described in detail in this example of the data reading apparatus, but it should be clear that the apparatus in this example can correspondingly implement all of the contents in the previous examples of the methods.

Figure 6:
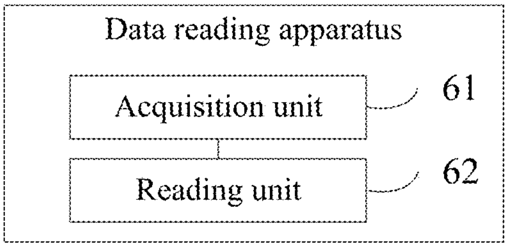
FIG. 6 shows a block diagram illustrating constitution of a data reading apparatus provided by an example of the present application.

As specifically shown in FIG. 6, the data reading apparatus includes: an acquisition unit 61 which may be configured for acquiring a writing sequence when determining that the writing sequence is locked, or when determining that an action for generating the writing sequence is prohibited, wherein the writing sequence is a sequence of a plurality of subdata contained in target data when writing operation is executed, and the writing sequence is different from an original arrangement sequence of the subdata in the target data; and a reading unit 62 which may be configured for executing reading operation on the subdata according to the writing sequence acquired by the acquisition unit 61.

Figure 7:
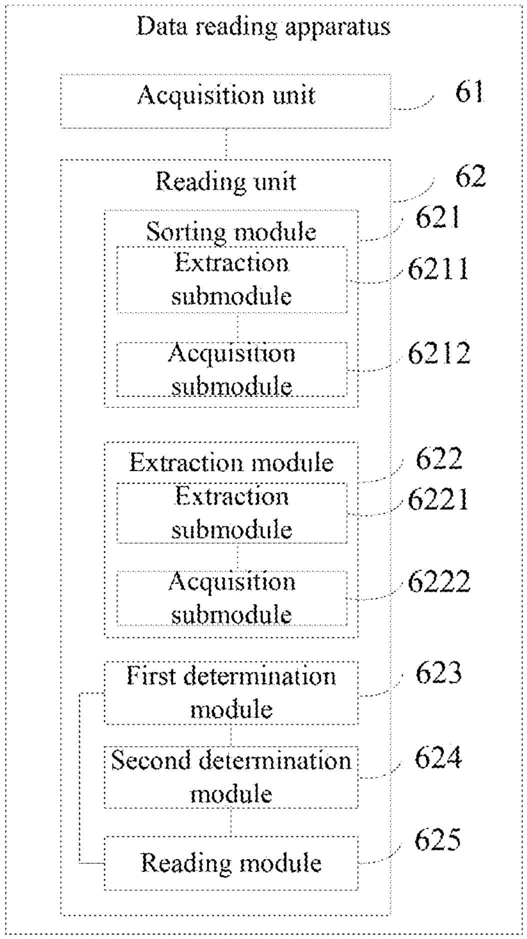
FIG. 7 shows a block diagram illustrating constitution of another data reading apparatus provided by an example of the present application.

Further, as shown in FIG. 7, the writing sequence is determined by acquiring an arrangement sequence of the subdata corresponding to a target number in a sequence list based on the target number generated by a preset random number generator; wherein the sequence list contains the arrangement sequence of each of the subdata and a corresponding arrangement sequence identifier; and the acquisition unit 61 may also be specifically configured for acquiring the arrangement sequence of the subdata corresponding to the target number in the sequence list based on the target number as the writing sequence when determining that the target number is locked, or when determining that a function of the preset random number generator is prohibited.

Further, as shown in FIG. 7, the reading unit 62 includes: a sorting module 621 which may be configured for extracting all of the subdata, and sorting the subdata based on the writing sequence to obtain the target data; and an extraction module 622 which may be configured for extracting corresponding subdata sequentially according to the writing sequence, and obtaining the target data after extracting all of the subdata.

Further, as shown in FIG. 7, the sorting module 621 includes: an extraction submodule 6211 which may be configured for extracting data containing all of the subdata and all of corresponding idle characters as extracted data when determining that the idle characters corresponding to the subdata are also stored in a memory storing the subdata; and an acquisition submodule 6212 which may be configured for determining a position of the idle character corresponding to each of the subdata in the extracted data and a data volume of the idle character in the extracted data extracted by the extraction submodule 6211, deleting all of the idle characters based on the position of each of the idle characters in the extracted data and the data volume of each of the idle characters to obtain all of the subdata, and sorting the subdata according to the writing sequence to obtain the target data.

Further, as shown in FIG. 7, the extraction module 622 includes: an extraction submodule 6221 which may be configured for determining a storage address of each of the subdata in the memory, and extracting each of the subdata sequentially according to the storage address and the writing sequence when determining that idle characters corresponding to the subdata are also stored in the memory storing the subdata; and an acquisition submodule 6222 which may be configured for obtaining the target data when determining that all the subdata extracted by the extraction submodule 6221 is extracted.

Further, as shown in FIG. 7, the reading unit 62 further includes: a first determination module 623 which may be configured for determining data to be read based on a reading instruction, wherein the data to be read includes at least one of the subdata; a second determination module 624 which may be configured for determining a reading sequence of the data to be read based on the writing sequence when determining that the data to be read determined by the first determination module 623 contains at least two of the subdata, wherein the reading sequence is an arrangement sequence of the at least two of the subdata determined based on the writing sequence; and a reading module 625 which may be configured for reading the subdata in the data to be read determined by the first determination module 623 in the memory based on the reading sequence determined by the second determination module 624.

Figure 8:
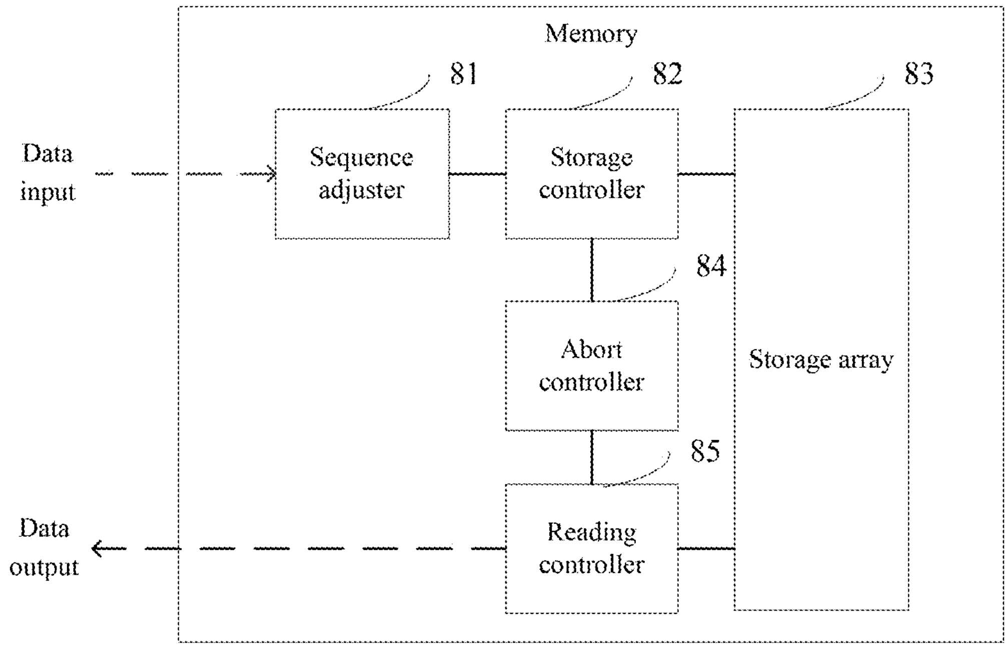
FIG. 8 shows a schematic diagram of a memory provided by an example of the present application.

In an example of the present application, a memory is further provided, as shown in FIG. 8, wherein the memory includes: a storage controller 82, a sequence adjuster 81, a storage array 83, and an abort controller 84; the sequence adjuster 81 may be configured for re-sorting various subdata contained in target data to generate a writing sequence, wherein the writing sequence is different from an original arrangement sequence of the subdata in the target data; the storage controller 82 may be configured for executing writing operation on the subdata in the storage array 83 according to the writing sequence; and the abort controller 84 may be configured for locking the writing sequence, or prohibiting execution of an action for generating the writing sequence after determining that the writing operation is executed on all the subdata by the storage controller 82.

Further, as shown in FIG. 8, the sequence adjuster 81 may also be configured for re-sorting the various subdata at least once to obtain at least one first arrangement sequence different from the original arrangement sequence as the writing sequence; and configured for recording each of the first arrangement sequences and a corresponding arrangement sequence identifier into a sequence list if a quantity of the first arrangement sequences is multiple, based on a target number generated by a preset random number generator, searching for an arrangement sequence identifier matching the target number from the sequence list, and taking the first arrangement sequence corresponding to the arrangement sequence identifier as the writing sequence.

Further, as shown in FIG. 8, the sequence adjuster 81 is further specifically configured for re-sorting the various subdata contained in the target data multiple times by preset algorithms, wherein the preset algorithm selected during re-sorting each time includes one of a bubble sort algorithm, an insertion sort algorithm and a selection sort algorithm.

Further, as shown in FIG. 8, the abort controller 84 is further specifically configured for locking the writing sequence by locking the target number, or prohibiting the execution of the action for generating the writing sequence by prohibiting a function of the preset random number generator after determining that the writing operation is executed on all the subdata.

Further, as shown in FIG. 8, the storage controller 82 is further configured for setting a corresponding idle character for each of the subdata; and writing the idle character into a next storage address adjacent to a storage address after writing each of the subdata into the storage address, wherein a number of bytes of the idle character is greater than or equal to a number of bytes of the corresponding subdata.

Further, as shown in FIG. 8, the memory further includes: a reading controller 85 configured for acquiring a writing sequence when determining that the writing sequence is locked, or when determining that an action for generating the writing sequence is prohibited by the abort controller 84, wherein the writing sequence is a sequence of a plurality of subdata contained in target data when writing operation is executed, and the writing sequence is different from an original arrangement sequence of the subdata in the target data; and executing reading operation on the subdata in the storage array according to the writing sequence.

Further, as shown in FIG. 8, the writing sequence is determined by acquiring an arrangement sequence of the subdata corresponding to a target number in a sequence list based on the target number generated by a preset random number generator; wherein the sequence list contains the arrangement sequence of each of the subdata and a corresponding arrangement sequence identifier; and the reading controller 85 is further configured for acquiring the arrangement sequence of the subdata corresponding to the target number in the sequence list based on the target number as the writing sequence when determining that the target number is locked, or when determining that a function of the preset random number generator is prohibited.

Further, as shown in FIG. 8, the reading controller 85 is configured for extracting all of the subdata, and sorting the subdata based on the writing sequence to obtain the target data; or extracting corresponding subdata sequentially according to the writing sequence, and obtaining the target data after extracting all of the subdata.

Further, as shown in FIG. 8, the reading controller 85 is configured for extracting data containing all of the subdata and all of corresponding idle characters as extracted data when determining that the idle characters corresponding to the subdata are also stored in a memory storing the subdata; and determining a position of the idle character corresponding to each of the subdata in the extracted data and a data volume of the idle character in the extracted data, deleting all of the idle characters based on the position of each of the idle characters in the extracted data and the data volume of each of the idle characters to obtain all of the subdata, and sorting the subdata according to the writing sequence to obtain the target data.

Further, as shown in FIG. 8, the reading controller 85 is further specifically configured for determining a storage address of each of the subdata in the memory, and extracting each of the subdata sequentially according to the storage address and the writing sequence when determining that idle characters corresponding to the subdata are also stored in the memory storing the subdata; and obtaining the target data when determining that all the subdata is extracted.

Further, as shown in FIG. 8, the reading controller 85 is further configured for determining data to be read based on a reading instruction, wherein the data to be read includes at least one of the subdata; determining a reading sequence of the data to be read based on the writing sequence when determining that the data to be read contains at least two of the subdata, wherein the reading sequence is an arrangement sequence of the at least two of the subdata determined based on the writing sequence; and reading the subdata in the data to be read in the storage array 83 based on the reading sequence.

Examples of the present application provide a method and apparatus for data writing and reading. Since various subdata of the target data is written into the addresses of the memory according to the writing sequence, and the writing sequence is different from the original arrangement sequence of the subdata in the target data, the sequence of storing the various subdata in the addresses of the memory is different from the sequence of storing the subdata in the addresses according to the original arrangement sequence in a conventional manner. Namely, data obtained by combining the stored various subdata according to a sequence among the addresses is different from the target data, and therefore during data reading, data obtained by reading the various subdata only according to a physical sequence among the addresses in the memory by a cracker in the case where the writing sequence is unknown is different from the target data, thereby increasing the difficulty in cracking the data stored in the memory, and ensuring the security of data storage.

Moreover, after the writing operation is executed, the writing sequence is also locked or the execution of the action for generating the writing sequence is prohibited, and in the reading process, firstly whether the writing sequence or action for generating the writing sequence is locked is decided, so as to ensure that the problem of subsequent reading failure caused by generating the writing sequence again after completing a writing action in a process of executing data writing and reading each time can be avoided, and the problem of abnormal data reading caused by tampering with the writing sequence is also avoid, thereby further guaranteeing the security of data storage.

An example of the present application provides a storage medium, including a stored program, wherein a device in which the storage medium is positioned is controlled to execute the above data writing and reading methods during program runtime.

The storage medium may include a volatile memory, a random access memory (RAM), and/or a non-volatile memory and other forms in computer-readable media, such as a read-only memory (ROM) or a flash random access memory (flash RAM), and the memory includes at least one storage chip.

An example of the present application further provides a data extraction apparatus, including a storage medium; and one or more processors, wherein the storage medium is coupled to the processors, and the processors are configured for executing program instructions stored in the storage medium; and the program instructions execute the above data writing and reading methods during running.

Further, an example of the present disclosure further provides an electronic device, including a processor and a memory, wherein the above generation unit 41, the writing unit 42, the execution unit 43 and the like, or the above acquisition unit 61, the reading unit 62 and the like are all stored in the memory as program units, and the above program units stored in the memory are executed by the processor to implement corresponding functions. The processor contains a core, and the corresponding program unit is called by the core from the memory.

One or more cores may be disposed, and a data writing and reading method is implemented by adjusting core parameters, so as to solve the problems of increasing the difficulty in cracking data stored in an OTP memory, and ensuring the security of data storage.

An example of the present disclosure provides a storage medium having a program stored thereon, wherein the program implements a data writing and reading method when executed by a processor.

An example of the present application provides a processor configured for running a program, wherein the program executes a data writing and reading method during running.

An example of the present application further provides a computer program product, wherein the computer program product is adapted to execute a program initialized with the following method steps when executed on a data processing device: re-sorting various subdata contained in target data to generate a writing sequence, wherein the writing sequence is different from an original arrangement sequence of the subdata in the target data; and executing writing operation on the subdata according to the writing sequence.

Further, re-sorting various subdata contained in target data to generate a writing sequence, includes: determining an original arrangement sequence of the various subdata in the target data, and re-sorting the various subdata to obtain a first arrangement sequence; and when the first arrangement sequence is different from the original arrangement sequence, determining the first arrangement sequence as the writing sequence.

Further, re-sorting various subdata contained in target data to generate a writing sequence, includes: re-sorting the various subdata contained in the target data multiple times, and generating a sequence list, wherein the sequence list contains a plurality of second arrangement sequences, and the second arrangement sequence is an arrangement sequence of the subdata obtained by re-sorting each time; and a target number is generated based on a preset random number generator, and the second arrangement sequence corresponding to the target number is determined as the writing sequence in the sequence list.

Further, re-sorting the various subdata contained in the target data multiple times, and generating a sequence list, includes: re-sorting the various subdata contained in the target data multiple times by preset algorithms, wherein the preset algorithm includes one of a bubble sort algorithm, an insertion sort algorithm and a selection sort algorithm; and determining a second arrangement sequence based on the arrangement sequence of the subdata generated after re-sorting each time and recording the second arrangement sequence to obtain a sequence list, wherein the sequence list contains each second arrangement sequence and a corresponding arrangement sequence identifier; and generating a target number based on a preset random number generator, and determining a second arrangement sequence corresponding to the target number as a writing sequence in a sequence list, includes: generating a target number based on a preset random number generator, and determining a target arrangement sequence identifier corresponding to the target number in a plurality of arrangement sequence identifiers in a sequence list; and determining a second arrangement sequence corresponding to the target arrangement sequence identifier as a writing sequence.

Further, after executing writing operation on the subdata according to the writing sequence, the method further includes: locking the writing sequence, or prohibiting execution of an action for generating the writing sequence after determining that the writing operation is executed on all the subdata.

Further, locking the writing sequence, or prohibiting execution of an action for generating the writing sequence after determining that the writing operation is executed on all the subdata, includes: locking the target number, or locking the preset random number generator after determining that the writing operation is executed on all the subdata.

Further, executing writing operation on the subdata according to the writing sequence, includes: setting a corresponding idle character for each of the subdata when writing the subdata according to the writing sequence; and writing the idle character into a next storage address adjacent to a storage address after writing each of the subdata into the storage address.

Further, a number of bytes of the idle character is greater than or equal to a number of bytes of the corresponding subdata.

An example of the present application further provides another computer program product, wherein the computer program product is adapted to execute a program initialized with the following method steps when executed on a data processing device: acquiring a writing sequence, wherein the writing sequence is a sequence of a plurality of subdata contained in target data when writing operation is executed, and the writing sequence is different from an original arrangement sequence of the subdata in the target data; and executing reading operation on the subdata according to the writing sequence.

Further, acquiring a writing sequence, includes: acquiring a writing sequence when determining that the writing sequence is locked, or an action for generating the writing sequence is prohibited.

Further, the writing sequence is determined based on the target number generated by the preset random number generator; and acquiring a writing sequence when determining that the writing sequence is locked, or an action for generating the writing sequence is prohibited, includes:

acquiring a writing sequence when determining that the target number is locked, or the preset random number generator is locked.

Further, the writing sequence is determined by the arrangement sequence of a plurality of subdata in the sequence list based on the target number; and acquiring a writing sequence, includes: acquiring an arrangement sequence of the subdata corresponding to a target number in a sequence list based on the target number as a writing sequence.

Further, the sequence list contains the arrangement sequence of each of the subdata and a corresponding arrangement sequence identifier; and acquiring an arrangement sequence of the subdata corresponding to a target number in a sequence list based on the target number as a writing sequence, includes: acquiring an arrangement sequence identifier corresponding to the target data in the sequence list as a target arrangement sequence identifier, and determining the subdata corresponding to the target arrangement sequence identifier as the writing sequence.

Further, executing reading operation on the subdata according to the writing sequence, includes: extracting all of the subdata, and sorting the subdata based on the writing sequence to obtain the target data; or extracting corresponding subdata sequentially according to the writing sequence, and obtaining the target data after extracting all of the subdata.

Further, extracting all of the subdata, and sorting the subdata based on the writing sequence to obtain the target data, includes: extracting data containing all of the subdata and all of corresponding idle characters as extracted data when determining that the idle characters corresponding to the subdata are also stored in a memory storing the subdata; and determining a position of the idle character corresponding to each of the subdata in the extracted data and a data volume of the idle character in the extracted data, deleting all of the idle characters based on the position of each of the idle characters in the extracted data and the data volume of each of the idle characters to obtain all of the subdata, and sorting the subdata according to the writing sequence to obtain the target data.

Further, extracting corresponding subdata sequentially according to the writing sequence, and obtaining the target data after extracting all of the subdata, includes: determining a storage address of each of the subdata in the memory, and extracting each of the subdata sequentially according to the storage address and the writing sequence when determining that idle characters corresponding to the subdata are also stored in the memory storing the subdata; and obtaining the target data when determining that all the subdata is extracted.

Further, executing reading operation on the subdata according to the writing sequence, further includes: determining data to be read based on a reading instruction, wherein the data to be read includes at least one of the subdata; determining a reading sequence of the data to be read based on the writing sequence when determining that the data to be read contains at least two of the subdata, wherein the reading sequence is an arrangement sequence of the at least two of the subdata determined based on the writing sequence; and reading the subdata in the data to be read in the memory based on the reading sequence.

The present application is described with reference to flowcharts and/or block diagrams of methods, devices (systems), and computer program products according to the examples of the present application. It should be understood that each flow and/or block in the flowcharts and/or the block diagrams, and combinations of flows and/or blocks in the flowcharts and/or the block diagrams, may be implemented by computer program instructions. These computer program instructions may be provided to processors of a general-purpose computer, a special-purpose computer, an embedded processor, or other programmable data processing devices to produce a machine, so that the instructions executed by the processors of the computers or other programmable data processing devices produce apparatuses configured for implementing designated functions in the in one or more flows of the flowchart and/or one or more blocks of the block diagram.

In a typical configuration, a device includes one or more central processing units (CPUs), a memory and a bus. The device may further include an input/output interface, a network interface and the like.

The memory may include a volatile memory, a random access memory (RAM), and/or a non-volatile memory and other forms in computer-readable media, such as a read-only memory (ROM) or a flash random access memory (flash RAM), and the memory includes at least one storage chip. The memory is an instance of the computer-readable medium.

The computer-readable medium includes non-volatile and volatile, removable and non-removable media, and may implement information storage by any method or technology. The information may be computer-readable instructions, data structures, modules of the programs, or other data. Instances of the storage media for the computers include, but are not limited to, a parallel random access machine (PRAM), a static random access memory (SRAM), a dynamic random access memory (DRAM), and other types of random access memories (RAMs), a read-only memory (ROM), an electrically erasable programmable read-only memory (EEPROM), a flash memory or other memory technologies, a compact disc read-only memory (CD- ROM), a digital versatile disc (DVD) or other optical memories, magnetic cassettes, magnetic tape and magnetic disc memories or other magnetic storage devices or any other non-transmission media, which may be configured for storing information accessible by a computing device. As defined herein, the computer-readable medium does not include transitory media, such as modulated data signals and carrier waves.

It should also be noted that the terms "including", "containing", or any other variation thereof, are intended to cover non-exclusive inclusion, so that a process, method, commodity or device including a series of elements does not include only those elements, but may include other elements not expressly listed or inherent to such process, method, commodity or device. The element proceeded by the phrase "including one . . . " does not preclude the existence of additional identical elements in the process, method, commodity or device including the element without more constraints.

It should be understood by those skilled in the art that the examples of the present application may be provided as methods, systems or computer program products. Therefore, the forms of an entire hardware example, an entire software example or an example combining software and hardware aspects may be adopted in the present application. Moreover, the form of a computer program product embodied on one or more computer-usable storage media (including, but not limited to, a magnetic disk memory, a CD-ROM, an optical memory and the like) containing computer-usable program codes may be adopted in the present application.

The foregoing is merely the examples of the present application, and is not intended to limit the present application. For those skilled in the art, various alterations and changes may be made to the present application. Any modification, equivalent replacement, improvement and the like made within the spirit and principle of the present application shall fall within the scope of the claims of the present application.

The invention claimed is:

1. A data writing method, wherein the method is applied during a process of writing data into an One Time Programmable (OTP) memory and comprising:

the OTP memory re-sorting various subdata contained in target data to generate a writing sequence, wherein the target data is data to be written into the OTP memory, the writing sequence is different from an original arrangement sequence of the subdata in the target data;

the OTP memory executing writing operation on the subdata according to the writing sequence to write the plurality of subdata into the OTP memory sequentially;

the OTP memory locking the writing sequence into a designated register, locking the writing sequence, or the OTP memory prohibiting execution of an action for generating the writing sequence to prevent tampering with the writing sequence after determining that the writing operation is executed on all the subdata;

wherein the re-sorting various subdata contained in target data to generate a writing sequence comprises:

re-sorting the various subdata at least once to obtain at least one first arrangement sequence different from the original arrangement sequence as the writing sequence;

recording each of the first arrangement sequences and a corresponding arrangement sequence identifier into a sequence list when a quantity of the first arrangement sequences is multiple;

based on a target number generated by a preset random number generator, searching for an arrangement sequence identifier matching the target number from the sequence list; and taking the first arrangement sequence corresponding to the arrangement sequence identifier as the writing sequence.

2. The method according to claim 1, wherein the re-sorting the various subdata at least once, comprises:

re-sorting the various subdata contained in the target data multiple times by preset algorithms, wherein the preset algorithm selected during re-sorting each time comprises one of a bubble sort algorithm, an insertion sort algorithm and a selection sort algorithm.

3. The method according to claim 2, wherein the executing writing operation on the subdata according to the writing sequence, comprises:

setting a corresponding idle character for each of the subdata; and writing the idle character into a next storage address adjacent to a storage address after writing each of the subdata into the storage address, wherein a number of bytes of the idle character is greater than or equal to a number of bytes of the corresponding subdata.

4. The method according to claim 1, wherein the locking the writing sequence, or prohibiting execution of an action for generating the writing sequence after determining that the writing operation is executed on all the subdata, comprises:

locking the writing sequence by locking the target number, or prohibiting the execution of the action for generating the writing sequence by prohibiting a function of the preset random number generator after determining that the writing operation is executed on all the subdata.

5. The method according to claim 4, wherein the executing writing operation on the subdata according to the writing sequence, comprises:

setting a corresponding idle character for each of the subdata; and writing the idle character into a next storage address adjacent to a storage address after writing each of the subdata into the storage address, wherein a number of bytes of the idle character is greater than or equal to a number of bytes of the corresponding subdata.

6. The method according to claim 1, wherein the executing writing operation on the subdata according to the writing sequence, comprises:

setting a corresponding idle character for each of the subdata; and writing the idle character into a next storage address adjacent to a storage address after writing each of the subdata into the storage address, wherein a number of bytes of the idle character is greater than or equal to a number of bytes of the corresponding subdata.

7. The method according to claim 1, wherein the executing writing operation on the subdata according to the writing sequence, comprises:

setting a corresponding idle character for each of the subdata; and writing the idle character into a next storage address adjacent to a storage address after writing each of the subdata into the storage address, wherein a number of bytes of the idle character is greater than or equal to a number of bytes of the corresponding subdata.

8. An One Time Programmable (OTP) memory, comprising: a storage controller, a sequence adjuster, an abort controller and a storage array;

wherein the sequence adjuster is configured for re-sorting various subdata contained in target data to generate a writing sequence, wherein the target data is data to be written into the OTP memory, the writing sequence is different from an original arrangement sequence of the subdata in the target data;

the storage controller is configured for executing writing operation on the subdata in the storage array according to the writing sequence to write the plurality of subdata into the storage array sequentially;

the abort controller is configured for locking the writing sequence into a designated register, locking the writing sequence, or prohibiting execution of an action for generating the writing sequence in the OTP memory to prevent tampering with the writing sequence after determining that the writing operation is executed on all the subdata;

the sequence adjuster is specifically configured for re-sorting the various subdata at least once to obtain at least one first arrangement sequence different from the original arrangement sequence as the writing sequence;

recording each of the first arrangement sequences and a corresponding arrangement sequence identifier into a sequence list when a quantity of the first arrangement sequences is multiple;

based on a target number generated by a preset random number generator;

searching for an arrangement sequence identifier matching the target number from the sequence list; and taking the first arrangement sequence corresponding to the arrangement sequence identifier as the writing sequence.

* * * * *